United States Patent [19]

Curry et al.

[11] Patent Number: 5,616,073
[45] Date of Patent: Apr. 1, 1997

[54] APPARATUS AND METHOD FOR PROCESSING HOG STOMACHS

[75] Inventors: Mark H. Curry, Rogers; Donald M. Zimmerman, Springdale, both of Ark.; John C. Haley, Pittsburg, Mo.

[73] Assignee: Tyson Holding Company, Wilmington, Del.

[21] Appl. No.: 549,049

[22] Filed: Oct. 27, 1995

[51] Int. Cl.⁶ .................................................. A22B 5/18
[52] U.S. Cl. ........................................ 452/123; 452/173
[58] Field of Search ................................. 452/123, 173, 452/77, 81

[56] References Cited

U.S. PATENT DOCUMENTS

| | | | |
|---|---|---|---|
| 38,888 | 6/1863 | Dortenbach | 452/123 |
| 427,046 | 5/1890 | Cherrieére . | |
| 1,039,912 | 9/1912 | Loerke . | |
| 2,641,020 | 6/1953 | Clemens et al. | 452/123 |
| 2,791,800 | 5/1957 | Lindstrom . | |
| 3,509,593 | 5/1970 | De Moss | 452/123 |
| 4,063,331 | 12/1977 | O'Neal et al. | 452/123 |
| 5,256,101 | 10/1993 | Koops | 452/123 |

FOREIGN PATENT DOCUMENTS

| | | | |
|---|---|---|---|
| 2565784 | 12/1985 | France | 452/123 |
| 562969 | 10/1932 | Germany | 452/123 |
| 350562 | 1/1961 | Switzerland | 452/123 |

*Primary Examiner*—Willis Little
*Attorney, Agent, or Firm*—Dougherty, Hessin, Beavers & Gilbert

[57] ABSTRACT

Apparatus and method for processing hog stomachs includes a base, an inversion member having a first end insertable through an opening in the stomach, a second end connected to the base, a first end opening in the first end, and a second end opening in the second end, the end openings coinciding with a passageway through the inversion member; and a contact member movably connected to the base and movable between a loading position adjacent the first end of the inversion member and an inverting position in the passageway.

34 Claims, 4 Drawing Sheets

APPARATUS AND METHOD FOR PROCESSING HOG STOMACHS

BACKGROUND OF THE INVENTION

This invention relates to apparatus and method for processing animal intestines and more particularly, but not by way of limitation, relates to apparatus and method for processing and inverting hog stomachs.

Apparatus and method for inverting animal intestines are known. For example, U.S. Pat. No. 427,046 (Cherriére) discloses a machine for reversing meat casings in which an animal meat casing is drawn over a conical head and tube. The latter end of the casing is allowed to fall into or enter a space between the end of the tube and the head, and the head is drawn back by means of a cord or chain to fasten the latter end of the casing between the end of the tube and head. The casing is then manipulated off the tube and reversed, the cord is released, and the head is forced away from the tube by a spring.

U.S. Pat. No. 1,038,912 (Loerke) discloses a sausage casing turner in which the sausage casing to be turned inside out is dropped into the bowl of the funnel and drawn down through the narrow tube of the funnel, a casing end is turned up over the outside of the end of the funnel tube, and a thimble is slipped over the end of the funnel tube and casing end. The funnel is then held by its handle and water poured in around the casing. The water runs down around the casing inside the funnel tube until its weight and volume pulls the casing downward through the funnel tube, thereby reversing the casing.

Both Cherriére and Loerke are too slow and labor intensive to produce inverted hog stomachs at a reasonable price. Cherriére requires an operator to manually pull a meat casing on and off of the device. Similarly to Cherriére, Loerke requires several manual steps to secure the casing in the funnel, pour water around the casing, and remove it from the funnel; and is therefore too labor intensive to produce inverted animal intestines at an acceptable price.

Because of the labor intensive nature of inverting intestines using known apparatus and method, currently, hog stomachs are split open and washed. This is typified by U.S. Pat. No. 2,791,800 (Lindstrom) which discloses a hog stomach opener and washer.

There is a demand and need for unsplit, or whole, hog stomachs in the food industry, particularly for unsplit hog stomachs which are produced at a price competitive with split stomachs. However, prior to the present invention, the cost of producing unsplit hog stomachs has made them unacceptable in the marketplace.

SUMMARY OF THE INVENTION

The present invention is contemplated to overcome the foregoing deficiencies and meet the above-described needs. In accomplishing this, the present invention provides a novel apparatus and method for processing hog stomachs.

Accordingly, the apparatus for processing hog stomachs includes a base; an inversion member having a first end insertable through an opening in the stomach, a second end connected to the base, a first end opening in the first end, and a second end opening in the second end, the end openings coinciding with a passageway through the inversion member; and a contact member movably connected to the base and movable between a loading position adjacent the first end of the inversion member and an inverting position in the passageway.

The method includes inserting an inversion member through an opening in the stomach so that a first end of the inversion member having a first end opening contacts the inside of the stomach; and moving a contact member from a loading position adjacent the inversion member into contact with the outside of the stomach and through the first end opening of the inversion member into an inverting position in order to invert the stomach. The method further provides for flushing the interior of the stomach in order to remove the contents of the stomach prior to inserting the inversion member. The method provides for washing the stomach after flushing and before inverting the stomach. The method also provides for washing the stomach after inverting the stomach.

BRIEF DESCRIPTION OF THE DRAWINGS

The present invention will be better understood by reference to the example of the following drawings.

DETAILED DESCRIPTION OF THE PREFERRED EMBODIMENTS

Preferred embodiments of the invention will now be described with reference to the drawings. Like reference characters refer to like or corresponding parts throughout the drawings and description.

FIGS. 1–8 present embodiments of the apparatus and method of the present invention for processing hog stomachs. Although the preferred embodiment, and the apparatus and method as described herein, are used for inverting hog stomachs, it is intended to be understood that the invention may be adapted for processing, cleaning, and inverting virtually any type of internal organ or the like.

Figure 1:
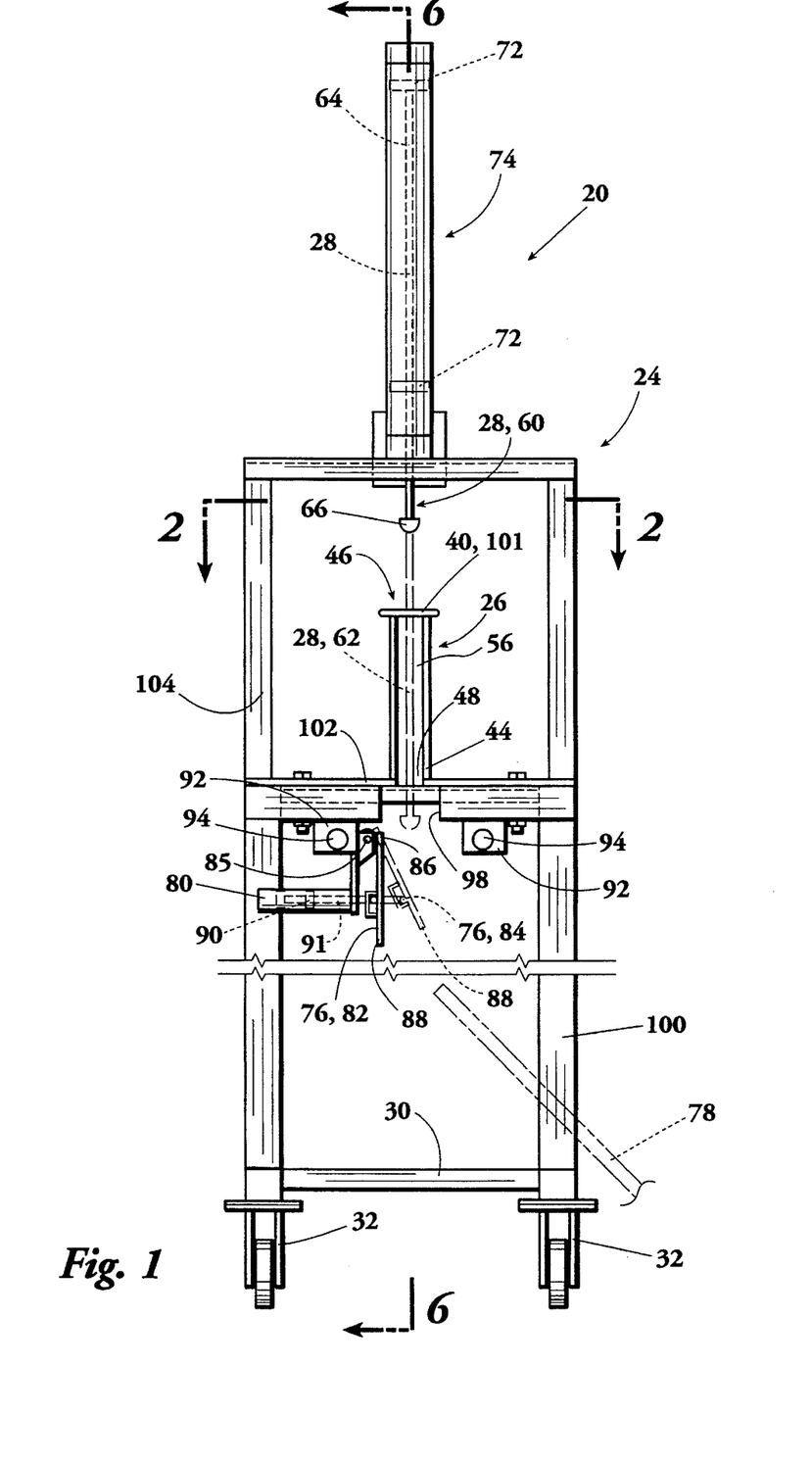
FIG. 1 is a front elevational view of an embodiment of the apparatus of the present invention.

Referring to the example of FIG. 1, the apparatus 20 for processing hog stomachs 22 (FIG. 3) may be generally described as including a base 24, an inversion member 26, and a contact member 28. The base 24 provides a frame or structure to which the inversion member 26 and contact member 28 may be connected and held in proper position. The base 24 may be a portion of a building structure or permanent fixture. In the preferred embodiment, the base 24 is custom manufactured for the apparatus 20 and includes a cart 30 having castors 32 so that the apparatus 20 may be moved. Preferably, the base 24 is provided with clamps (not illustrated) which may be used to clamp the apparatus 20 to another piece of equipment or structure and thereby secure the position of the apparatus 20 once a location for the apparatus 20 has been selected.

Figures 3, 8:
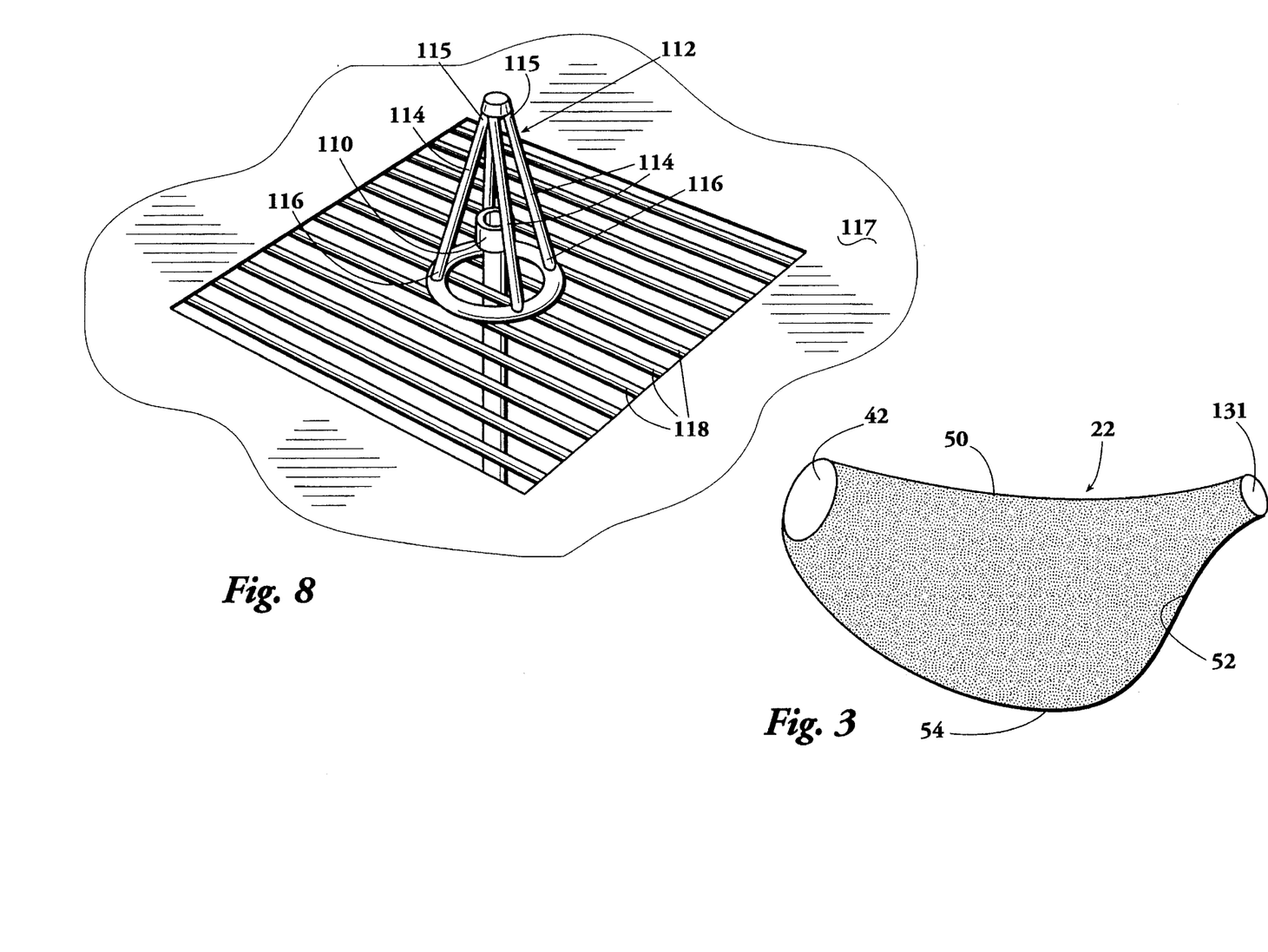
FIG. 3 is a representative drawing of a hog stomach.
FIG. 8 is a prospective view of an embodiment of the flushing station of the present invention.
Figures 4, 5, 6:
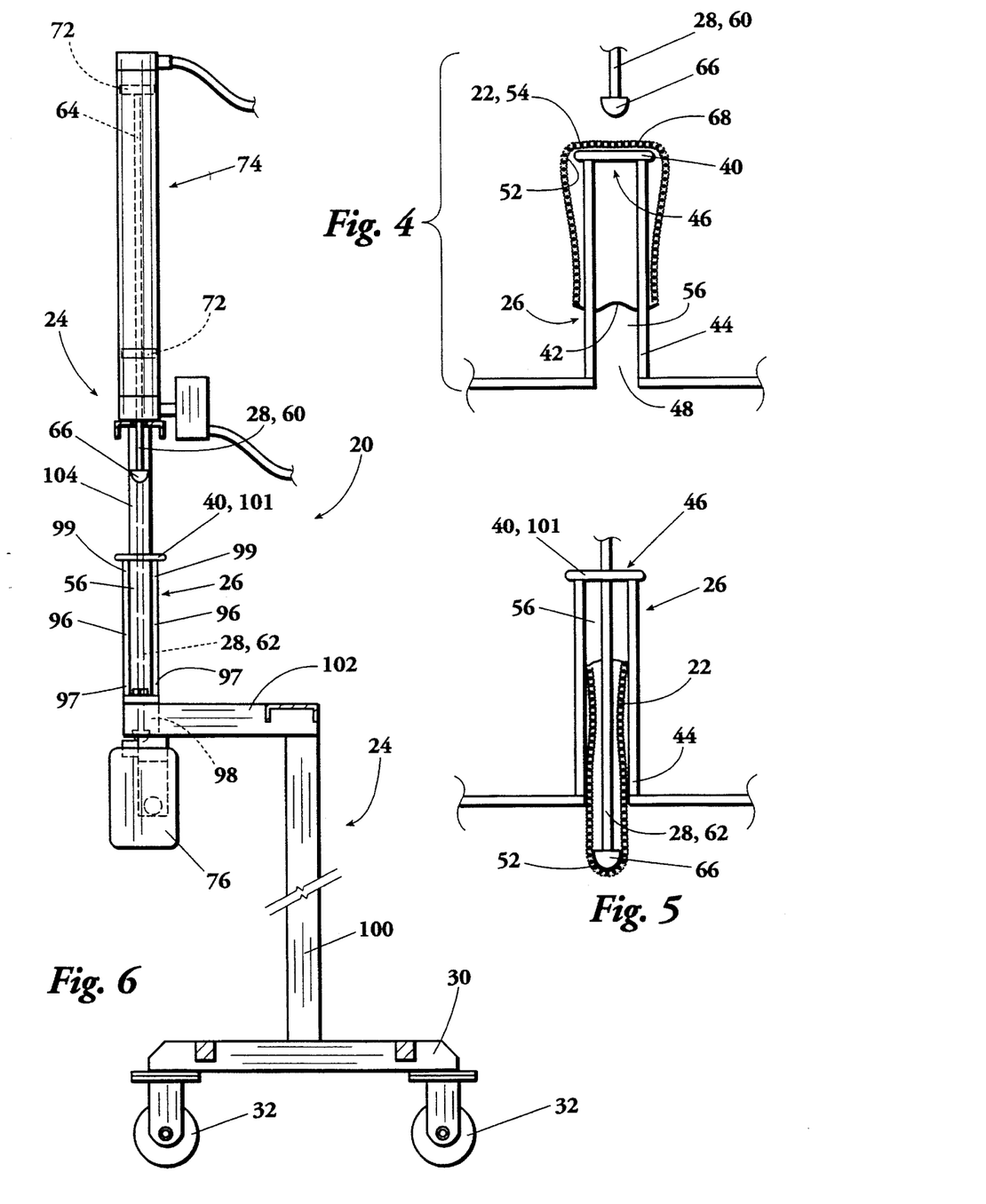
FIG. 4 is a front elevational view of an embodiment of the inversion member of the present invention showing the contact member in a loading position.
FIG. 5 is front elevational view of an embodiment of the inversion member of the present invention showing the contact member in an inverting position.
FIG. 6 is a side elevational view taken along line 6—6 of FIG. 1.

Referring to example FIGS. 3–5, the inversion member 26 includes a first end 40 insertable through an opening 42 in the stomach 22, a second end 44 connected to the base, a first end opening 46 in the first end 40, and a second end opening 48 in the second end 44. Preferably, the first end 40 is inserted through opening 42 in a first side 50 of the stomach 22 into contact with the inside 52 of a second side 54 of the stomach. The end openings 46, 48 coincide with a passageway 56 extending through the inversion member 26. Preferably, the inversion member end openings 46, 48 are aligned with the passageway 56.

The contact member 28 is movably connected to the base 24 and is movable between a loading position 60 adjacent the first end 40 of the inversion member 26 and an inverting position 62 in which the contact member 28 extends into the passageway 56. In the prototype apparatus, the contact member 28 includes a first end 64 movably connected to the base 24 and a second end 66 adjacent the first end 40 of the inversion member 26. Preferably, the second end 66 of the contact member 28 is spaced away from the first end 40 of the inversion member 26 in the loading position 60 and extends through the passageway 56 and beyond the second end 44 of the inversion member 26 in the inverting position 62. In the prototype apparatus, the second end 66 of the contact member 28 extends into contact with the outside 68 of the second side 54 of the stomach and through the first end opening 46 of the inversion member 26 in order to invert the stomach 22 while moving from the loading position 60 to the inverting position 62.

Referring to the example of FIGS. 1 and 6, the prototype apparatus 20 includes an inversion actuator 74, connected to the base 24 and to the contact member 28, for selectably moving the contact member 28 between the loading position 60 and the inverting position 62. The inversion actuator 74 may be any means for moving the contact member 28 between the loading position 60 and the inverting position 62, such as a handle for manually moving the contact member, a foot pedal for moving the contact member 28, or a hydraulically, electrically, or electronically powered and controlled actuator, as would be known to one skilled in the art in view of disclosure contained herein. In the prototype apparatus 20, the inversion actuator 74 is a pneumatically powered piston cylinder actuator 74 and the first end 64 of the contact member 28 is connected to the piston 72 of the inversion actuator 74 in order to automatically move the contact member 28 between the loading position 60 and inverting position 62.

Referring to the example of FIGS. 1 and 6, the prototype apparatus 20 includes a deflector 76, connected to the base 24 adjacent the second end 44 of the inversion member 26, for deflecting inverted hog stomachs 22 into a disposal zone 78. The deflector 76 may be any means for guiding or deflecting the stomachs discharged from the second end of the inversion member 26 to a desired disposal zone 78. The deflector 76 may be stationary and of fixed orientation, such as an inclined surface placed in the path of stomachs discharging from the second end 44 of the inversion member 26, so that it accomplishes the desired deflecting or guiding of the hog stomachs merely by its positioning. Normally the apparatus 20 will be oriented so that the first end 40 of the inversion member 26 is above the second end 44 and the deflector 76 will be positioned below the second end 44 of the inversion member 26.

The prototype apparatus 20 includes a deflector actuator 80, connected between the base 24 and the deflector 76, for moving deflector 76 between an inactive position 82 and a deflecting position 84. In the prototype apparatus 20, the deflector 76 has a first end 86 and a second end 88; and the first end 86 is normally above the second end 88. The first end 86 is pivotably connected to the base 24 at hinge 85 so that the first end 86 of the deflector 76 pivots about an axis about perpendicular to the axis of motion of the contact member 28. Normally, the contact member 28 will move in a vertical motional axis and the first end 86 of the deflector 76 will pivot about a horizontal axis. The deflector 76 is positioned on the base 24 so that in its inactive position 82 it is about parallel to the motional axis of the contact member 28 and does not obstruct hog stomachs or other objects falling from the second end 44 of the inversion member 26. The deflector actuator 80 is connected to the base so that it is positioned adjacent the second end 88 of the deflector 76.

The piston 90 of the deflector actuator 80 is connected to or contacts the second end 88 of the deflector 76 via rod 91 so that when the piston 90 and rod 91 extend with respect to the deflector actuator 80 the deflector 76 is moved to the deflecting position 84 in which the deflector 76 is angled across the vertical axis of the inversion member 26 below the second end 44 of the inversion member 26. When the piston 90 and rod 91 are retracted with respect to the deflector actuator 80 the deflector is moved to the inactive position 82. The deflector actuator 80 may be any means for moving the deflector 76 between the inactive and deflecting positions 82, 84, such as a manually operated positioning mechanism or a hydraulically, electrically, or electronically powered and controlled actuator, as would be known to one skilled in the art in view of the disclosure contained herein. The preferred deflector actuator 80 is a pneumatically powered piston cylinder actuator.

The prototype apparatus 20 also includes a control circuit 92 connected to the inversion actuator 74, for selectably providing a control signal to the inversion actuator 74 and thereby selectably enabling the inversion actuator 74 to move the contact member between the loading position 60 and the inverting position 62. Preferably, the control circuit 92 is also connected to the deflector actuator 80 for selectably providing a control signal to the deflector actuator 80 in order to simultaneously (with the inversion actuator 74) selectably enable the deflector actuator 80 to move the deflector between the inactive position 82 and deflecting position 84. The control circuit may be any means capable of selectably enabling and controlling the inversion and/or deflector actuators 74, 80 to function as described herein.

In the prototype apparatus 20, the control circuit comprises pneumatic logic components (not illustrated) which are connected to manually activated switches 94. Equivalent hydraulic, electronic, electric, or computer components may be used to provide the control circuit 92, as would be known to one skilled in the art in view of the disclosure contained herein. When the operator depresses both switches 94, the control circuit 92 automatically enables the inversion and deflector actuators 74, 80 to move the pistons 72, 90 in their cylinders in such a manner as to move the contact member 28 from the loading position 60 to the inverting position 62 and then return the contact member from the inverting position 62 to the loading position 60, while simultaneously moving the deflector 76 from the inactive position 82 to the deflecting position 84 and returning the deflector 76 from the deflecting position to the inactive position after the stomach has been inverted. The use of the switches 94 to initiate automatic operation of the contact member 28 and deflector 76 frees the operator's hands during inversion of a hog stomach so that the operator may be handling the next stomach for inversion.

The inversion member 26 should be sized to spread the stomach 22 over its outside surface sufficiently that the stomach 22 will not wad up as the contact member 28 travels into the inversion member 26 in order to invert the stomach. In the prototype apparatus 20, the distance between the first and second ends 40, 44 of the inversion member 26 is about equal to or greater to or greater than the length of the stomach 22. The outside diameter of the inversion member 26 should be smaller than the largest opening in the stomach 22. The prototype inversion member 26 is about nine and one-half inches long and has a maximum diameter of about two inches.

Referring to example FIG. 6, the structure of the prototype apparatus 20 will now be described in more detail. In the prototype apparatus 20, the base 24 includes cart 30 having four castors 32, a lower frame 100 extending vertically from the cart 30, a horizontal platform 102 extending from the upper end of lower frame 100, and an upper frame 104 extending vertically above the horizontal platform 102 in a position which is not aligned with the vertical axis of the lower frame 100.

The inversion member 26 is connected to the horizontal platform 102 and is generally vertically aligned with the upper frame 104. The vertical axis of the inversion member 26 is offset away from the lower frame 100 in order to allow the operator access to the inversion member 26 with minimal interference from the cart 30 and lower frame 100. The inversion actuator 74 is connected to the upper frame 104 above the inversion member 26 so that the motional axis of the contact member 28 is aligned with the passageway 56 through the inversion member 26. When the contact member 28 is in its loading position 60 the second end 66 of the contact member 60 is spaced away from and above the first end 40 of the inversion member 26. When the contact member 28 is in the inverting position 62, the second end 66 of the contact member 28 extends through the passageway 56 and through the second end opening 48 of the inversion member 26.

Figure 2:
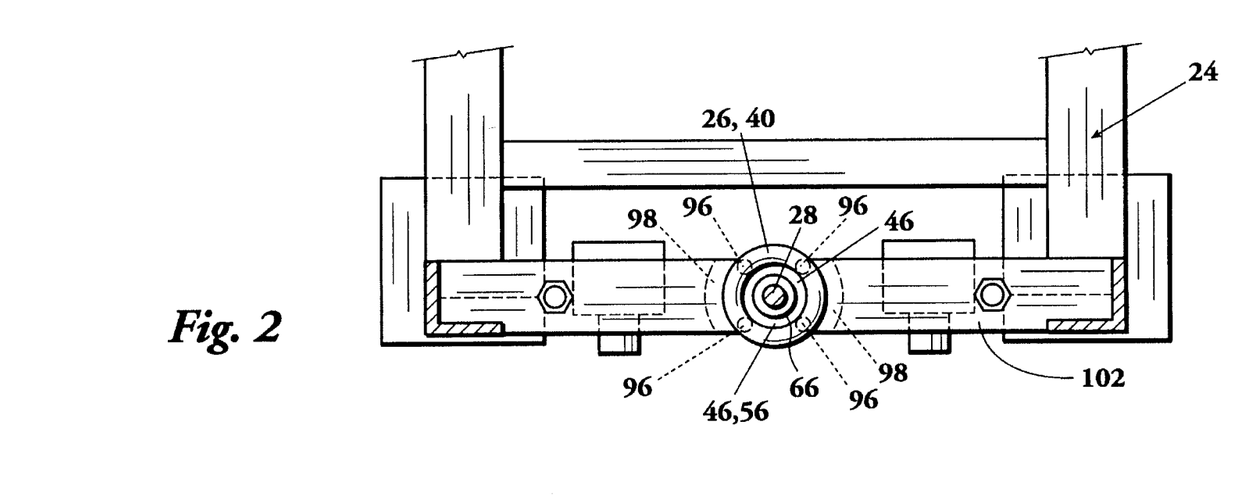
FIG. 2 is a partial sectional plan view taken along 2—2 of FIG. 1.

Referring to FIGS. 2 and 6, the prototype inversion member 26 includes four legs 96 which are about equidistantly spaced around the motional axis of the contact member 28. The legs define the sides of the passageway 56. Each leg 96 has a first end 97 which is connected to the horizontal platform 102 of the base 24 around an opening 98 in the horizontal platform 102. The opening 98 extends the passageway 56 through the horizontal platform 102. The second ends 99 of the legs 96 define the first end opening 46 in the inversion 26. In the prototype inversion member 26 the first end opening 46 of the inversion member 26 is further defined by a ring member 101 to which the first end 97 of the legs 96 is connected. The spaces between the legs 96 are open so that a stomach being inverted and passing through the passageway 56 has room to expand and slide through the passageway 56 without wadding up or binding inside the passageway 56. The legs 96 should be about parallel with each other and with the motional axis of the contact member 28. The outside diameter of the inversion member 26, as defined by the outside surfaces of the legs 96 and ring member 101, should be smaller than the largest opening 42 in the stomachs 22 to be inverted on the inversion member 26.

In the prototype apparatus 20, the deflector 76 and deflector actuator 80 are connected to and suspended below the horizontal platform 102, as are the manual switches 94 and control circuit 92.

In the prototype apparatus 20, the second end 66 of the contact member 28 is enlarged and rounded to distribute the pressure exerted by contact member 28 on the stomach 22 and avoid puncturing the stomach 22 with the contact member 28. Preferably, the enlarged second end 66 of the contact member 28 includes a replaceable enlarged tip made of ultra high molecular weight polymer ("UHMW"). UHMW is a plastic product widely used in the food processing industry. The preferred inversion actuator 74 is a pneumatically operated piston cylinder having a 20 inch stroke which operates at an air pressure of between 60 and 80 psi. The magnitude of the air pressure is selected to provide sufficient force to the contact member 28 to invert the stomach, but insufficient force to injure the operator or to puncture the stomach 22.

Referring to FIGS. 4 and 5, the method of processing hog stomachs 22 of the present invention includes inserting an inversion member 26 through an opening 42 in the stomach 22 so that a first end 40 of the inversion member 26 having a first end opening 46 contacts the inside 52 of the stomach 22, and moving a contact member 28 from a loading position 60 adjacent the inversion member 26 into contact with the outside 68 of the stomach 22 and through the first end opening 46 of the inversion member 26 into an inverting position 62 in order to invert the stomach 22. Preferably, the inversion member 26 is inserted so that the first end 40 of the inversion member 26 contacts the inside 52 of a second side 54 of the stomach 22. The method provides for discharging the inverted stomach 22 through a second end opening 48 in a second end 44 of the inversion member. The method further provides for deflecting the discharging inverted stomach 22 into a disposal zone 78 (FIG. 1).

Preferably, the contact member 28 discharges the inverted stomach 22 through the second end opening 48. More preferably, this is accomplished by the contact member 28 extending through both the first and second end openings 46, 48 of the inversion member 26 in the inverting position 62.

Figure 7:
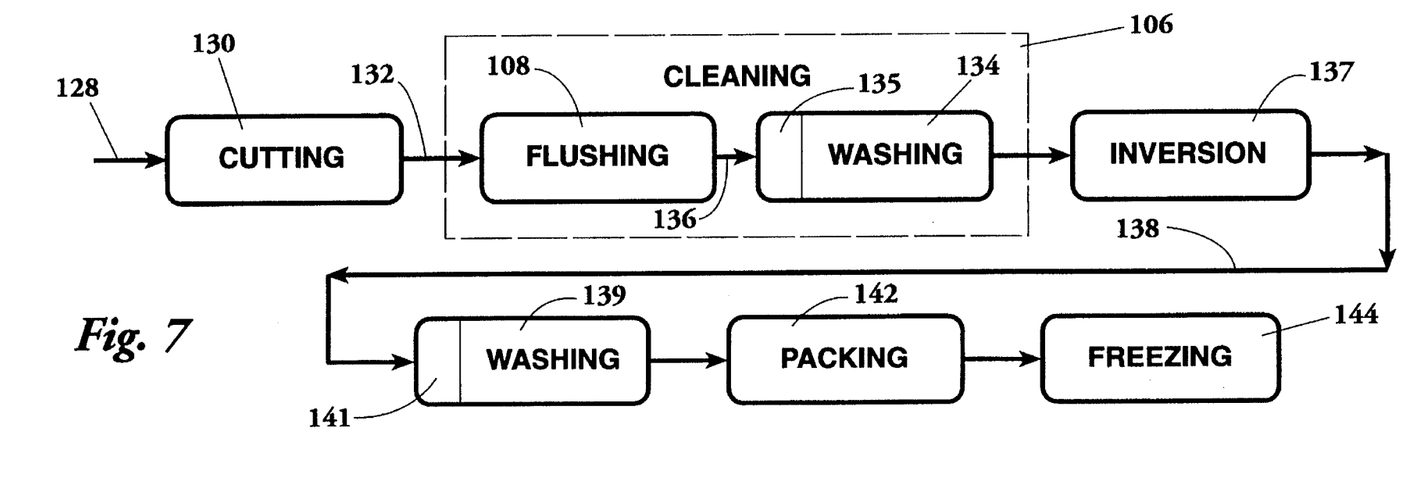
FIG. 7 is a block diagram of an embodiment of the method of the present invention.

Referring to the example of FIG. 7, in the preferred method, the stomach is cleaned before inserting the inversion member 26. The cleaning step 106 includes flushing the interior of the stomach 22 in order to remove the-contents of the stomach 22 prior to inserting the inversion member 26. Referring to the example of FIG. 8, the flushing step 108 includes inserting a liquid spout 110 into an opening 42 in the stomach 22 and flushing the stomach with liquid (preferably water) discharged from the spout 110.

Preferably, the flushing step 108 includes inserting a flushing frame 112 into an opening 42 in the stomach 22 in order to hold the opening 42 in an open position and flushing the stomach 22 with liquid discharged through the flushing frame 112 from a liquid spout 110. The preferred flushing frame 112 includes at least three or four side members 114 which are mounted above the liquid spout 110 and which incline towards each other and are joined together above the liquid spout 110 at their upper ends 115. The side members 114 should be long enough that substantially all of the stomach 22 may be extended along the length of the side members 114 and the lower end 116 of the side members 114 should be sufficiently spaced apart that the opening 42 in the stomach 22 will be sufficiently opened by the members 114 that the stomach 22 will be easily and fully flushed with liquid from the liquid spout 110. The spaces between the members 114 are left open to allow free flow of liquid (preferably water) from spout 110 into the stomach 22.

Preferably, the flushing frame 112 is part of a flushing station which also provides a holding area 117 for receiving uncleaned or unflushed stomachs 22 and a grating 118 above or upon which the flushing frame 112 is mounted, the grating 118 allowing the contents of the stomachs and liquid from the spout 110 to be drained away from the frame 112 and stomachs 22. In the preferred method, the liquid flow through spout 110 is turned on and off by a foot pedal (not illustrated) in order to leave the operator's hands free for handling the stomachs 22.

Referring to the example of FIG. 7, in the preferred method, the cleaning step 106 further comprises washing the stomach 22 after the flushing step 108. Preferably, the stomachs are washed in heated liquid (preferably water) in order to remove fat and to partially cook the stomachs 22. The method also provides for washing the stomach after inverting the stomach 22; and, more preferably, provides for washing the stomach in heated liquid in order to remove fat and partially cook the stomach 22 after the stomach has been inverted.

Referring to example FIG. 7, the preferred method of the present invention will described in greater detail. FIG. 7 is a block diagram and flowchart which schematically illustrates the preferred embodiment of the method of the present invention. It is contemplated that the method of processing hog stomachs exemplified in FIG. 7, will take place in a slaughterhouse or similar facility where hogs are killed. After a hog is killed, the intestines and internal organs are placed on a conveyor 128 or otherwise transported to the cutting step 130. At the cutting step 130, the stomachs are removed from the conveyor 128 and manually cut from the other internal organs without splitting the stomachs open by one or more attendants. The stomachs 22 are cut so that one natural opening 131 (FIG. 3) of the stomach 22 remains at its normal size (approximately one-half inch in diameter) and the other natural opening 42 is cut to be approximately two inches in diameter. The uncleaned stomachs are then placed in a water trough type conveyor 132 which moves them to the flushing step 108.

At the flushing step 108 the stomachs are flushed using the flushing frames 112 and liquid spout 110, as previously discussed. The flushing step 108 should remove 80–90 percent of the contents of the stomachs 22. The prototype method and flushing step 108 includes two flushing frames 112 and water spouts 110 so that two attendants may work simultaneously. After flushing the stomachs 22, they are manually placed in a vertical conveyor 136 which carries them to the washing step 134 which includes a washing machine. The preferred vertical conveyor 136 is a bucket-type conveyor which deposits the stomachs in the washing machine.

In the prototype method, the washing machine is a grease and slime remover made by LaParmentiere, Model No. 100L. The stomachs are received and retained in the load cell 135 of the washing machine until a preselected batch quantity (200 lbs. in the prototype) of stomachs are present. The washing machine then washes the batch of stomachs in a hot liquid (preferably water) in a three-cycle process: two minutes at 140° F., three minutes at 180° F., and two minutes at 140° F. As well as cleaning the stomachs, the first two cycles heat the stomachs sufficiently to remove fat from the stomachs and to partially cook the stomachs so that they turn from pink to brown in color; and the third cycle cools the stomachs for handling. After washing the stomachs are automatically discharged by the washing machine 122 into a holding area for the inversion step 137. The holding area is a table or work surface adjoining the apparatus 20 in the prototype method.

At the inversion step 137, the stomachs are inverted using one or more of the apparatus 20 previously described. As the stomachs 22 are discharged from the inversion step 137 and apparatus 20, they are deflected or guided by deflector 76 into a disposal zone 78, as previously discussed, which guides them onto a second vertical conveyor 138. In the prototype apparatus and method, the disposal zone 78 (FIG. 1) includes a hopper or feeder which receives the stomachs from the deflector 76 and guides them onto conveyor 138.

The second vertical conveyor 138 is a cleated-type conveyor which is inclined upward from below the apparatus 20 and which deposits the stomachs at the second washing step 139, which includes a second washing machine. In the prototype method, the second washing machine is a grease and slime remover made by LaParmentiere and identified as Model No. 100C. The stomachs are received and retained in the load cell 141 of the washing machine until a preselected batch quantity (200 lbs. in the prototype) of stomachs are present. In the second washing machine, the batch of stomachs are washed in a hot liquid (preferably water) in a three-cycle process: two minutes at 140° F. three minutes at 180° F., and two minutes at 65° F. The first two cycles heat the stomachs sufficiently to remove additional fat from the stomachs, finish partially cooking the stomachs to the desired shade of brown, and generally clean the stomachs. The third cycle cools the stomachs for handling and cleans them. The second washing machine automatically discharges the stomachs into a holding zone for packing step 142. In the packing step 142, the stomachs are normally manually packed into trays as required by the United States Department of Agriculture (USDA) for inspection purposes. After complying with USDA requirements, the stomachs are typically weighed and packaged in accordance with customer specifications and then frozen at freezing step 144 in preparation for delivery to the customer.

While presently preferred embodiments of the invention have been described herein for the purpose of disclosure, numerous changes in the construction and arrangement of parts and the performance of steps will suggest themselves to those skilled in the art in view of the disclosure contained herein, which changes are encompassed within the spirit of this invention, as defined by the following claims.

What is claimed is:

1. Apparatus for processing hog stomachs, comprising:

a base;

an inversion member having a first end insertable through an opening in the stomach, a second end connected to the base, a first end opening in the first end, and a second end opening in the second end, the end openings coinciding with a passageway through the inversion member; and a contact member movably connected to the base and movable between a stomach loading position adjacent the first end of the inversion member and a stomach inverting position in the passageway for inverting the stomach.

2. Apparatus of claim 1 in which the contact member comprises:

a first end movably connected to the base and a second end adjacent the first end of the inversion member, the second end of the contact member being spaced away from the first end of the inversion member in the loading position and extending through the passageway and beyond the second end of the inversion member in the inverting position.

3. Apparatus of claim 1, comprising:

an inversion actuator, connected to the base and to the contact member, for selectably moving the contact member between the loading position and the inverting position.

4. Apparatus of claim 3, comprising:

a control circuit, connected to the inversion actuator, for selectably providing a control signal to the inversion actuator and thereby selectably enabling the inversion actuator to move the contact member between the loading position and the inverting position.

5. Apparatus of claim 1, comprising:

a deflector, connected to the base adjacent the second end of the inversion member, for deflecting inverted hog stomachs into a disposal zone.

6. Apparatus of claim 5, comprising:

a deflector actuator, connected between the base and the deflector, for moving the deflector between an inactive position and a deflecting position.

7. Apparatus of claim 1:

wherein the distance between the first and second ends of the inversion member is about equal to or greater than the length of the stomach.

8. Apparatus for processing unsplit hog stomachs, comprising:

a base:

an inversion member having a first end insertable through an opening in a first side of the stomach into contact with the inside of a second side of the stomach, a second end connected to the base; a first end opening in the first end, and a second end opening in the second end, the end openings being aligned with a passageway through the inversion member; and a contact member having a first end movably connected to the base and a stomach second end, the contact member being movable between a loading position in which the second end of the contact member is spaced away from the first end of the insertion member and a stomach inverting position in which the second end of the contact member extends into contact with the outside of the second side of the stomach and through the first end opening of the inversion member in order to invert the stomach.

9. Apparatus of claim 8:

wherein the second end of the contact member extends through the passageway and beyond the second end of the inversion member in the inverting position.

10. Apparatus of claim 8, comprising:

an inversion actuator, connected to the base and to the first end of the contact member, for selectably moving the contact member between the loading position and the inverting position.

11. Apparatus of claim 10, comprising:

a control circuit, connected to the inversion actuator, for selectably providing a control signal to the inversion actuator and thereby selectably enabling the inversion actuator to move the contact member between the loading position and the inverting position.

12. Method of processing hog stomachs, comprising:

inserting an inversion member through an opening in the stomach so that a first end of the inversion member having a first end opening contacts the inside of the stomach; and moving a contact member from a loading position adjacent the inversion member into contact with the outside of the stomach and through the first end opening of the inversion member into an inverting position in order to invert the stomach.

13. Method of claim 12, comprising:

discharging the inverted stomach through a second end opening in a second end of the inversion member.

14. Method of claim 13, comprising:

deflecting the discharging inverted stomach into a disposal zone.

15. Method of claim 13:

wherein the contact member discharges the inverted stomach through the second end opening.

16. Method of claim 13:

wherein the contact member extends through both the first and second end openings of the inversion member in the inverting position.

17. Method of claim 12, comprising:

flushing the interior of the stomach in order to remove the contents of the stomach prior to inserting the inversion member.

18. Method of claim 17 in which the flushing step comprises:

inserting a liquid spout into an opening in the stomach; and flushing the stomach with liquid discharged from the spout.

19. Method of claim 17 in which the flushing step comprises:

inserting a flushing frame into an opening in the stomach in order to hold the opening in an opened position; and flushing the stomach with liquid discharged through the flushing frame from a liquid spout.

20. Method of claim 17, comprising:

washing the stomach after inverting the stomach.

21. Method of claim 20 in which the washing step comprises:

washing the stomach in heated liquid.

22. Method of claim 20, comprising:

washing the stomach after the flushing step and prior to inserting the inversion member.

23. Method of claim 22 in which the washing step comprises:

washing the stomach in heated liquid.

24. Method of processing unsplit hog stomachs, comprising:

cleaning the stomach;

inserting an inversion member through an opening in a first side of the stomach so that a first end of the inversion member having a first end opening contacts the inside of a second side of the stomach; and moving a contact member from a loading position adjacent the first end of the inversion member into contact with the outside of the second side of the stomach and through the first end opening of the inversion member into an inverting position in order to invert the stomach.

25. Method of claim 24 comprising:

discharging the inverted stomach through a second end opening in a second end of the inversion member.

26. Method of claim 25 comprising:

deflecting the discharging inverted stomach into a disposal zone.

27. Method of claim 25:

wherein the contact member extends through both the first and second end openings of the inversion member in the inverting position.

28. Method of claim 24, in which the cleaning step comprises:

flushing the interior of the stomach in order to remove the contents of the stomach prior to inserting the inversion member.

29. Method of claim 28 in which the flushing step comprises:

inserting a liquid spout into an opening in the stomach; and flushing the stomach with liquid discharged from the spout.

30. Method of claim 28 in which the flushing step comprises:

inserting a flushing frame into an opening in the stomach in order to hold the opening in an opened position; and flushing the stomach with liquid discharged through the flushing frame from a liquid spout.

31. Method of claim 24, comprising:

washing the entire stomach after inverting the stomach.

32. Method of claim 31 in which the washing step comprises:

washing the stomach in heated liquid.

33. Method of claim 24, comprising:

washing the stomach after the flushing step and prior to inserting the inversion member.

34. Method of claim 33 in which the washing step comprises:

washing the stomach in heated liquid.

* * * * *